US008355243B2

(12) United States Patent  
Niedzwiecki

(10) Patent No.: US 8,355,243 B2  
(45) Date of Patent: Jan. 15, 2013

(54) CLOSED DOOR CIRCUIT BREAKER RACKING EXTENSION

(75) Inventor: Michael L. Niedzwiecki, Omaha, NE (US)

(73) Assignee: Eaton Corporation, Cleveland, OH (US)

( * ) Notice: Subject to any disclaimer, the term of this patent is extended or adjusted under 35 U.S.C. 154(b) by 252 days.

(21) Appl. No.: 12/931,252

(22) Filed: Jan. 27, 2011

(65) Prior Publication Data

US 2012/0193193 A1    Aug. 2, 2012

(51) Int. Cl.  
*H02B 1/04* (2006.01)  
*H01H 9/20* (2006.01)

(52) U.S. Cl. ............... 361/610; 361/605; 200/50.24

(58) Field of Classification Search .......... 361/605, 361/610; 200/50.24  
See application file for complete search history.

(56) References Cited

U.S. PATENT DOCUMENTS

| | | | |
|---|---|---|---|
| 4,777,559 A * | 10/1988 | Bar et al. ............... | 361/610 |
| 5,278,722 A | 1/1994 | Peruso | |
| 5,453,587 A | 9/1995 | Hurley et al. | |
| 5,477,017 A | 12/1995 | Swindler et al. | |
| 6,215,654 B1 * | 4/2001 | Wilkie et al. ............ | 361/605 |
| 6,229,109 B1 | 5/2001 | Kretz et al. | |
| 6,229,691 B1 * | 5/2001 | Tanzer et al. ........... | 361/622 |
| 6,388,867 B1 * | 5/2002 | Rakus et al. ............ | 361/605 |
| 6,407,908 B1 * | 6/2002 | Iryo et al. .............. | 361/604 |
| 6,498,716 B1 * | 12/2002 | Salinas et al. .......... | 361/610 |
| 6,512,669 B1 * | 1/2003 | Goodwin et al. ........ | 361/601 |
| 6,529,368 B2 * | 3/2003 | Koga et al. ............. | 361/605 |
| 6,631,075 B2 * | 10/2003 | Kashima et al. ........ | 361/605 |
| 6,777,627 B1 | 8/2004 | Stevenson | |
| 6,875,935 B2 | 4/2005 | Abrahamsen et al. | |
| 6,897,388 B2 | 5/2005 | Greer | |
| 6,906,925 B2 * | 6/2005 | Robbins et al. ......... | 361/725 |
| 7,019,230 B1 | 3/2006 | Vaill et al. | |
| 7,053,321 B2 * | 5/2006 | Leccia et al. ........... | 200/50.1 |
| 7,312,980 B2 * | 12/2007 | Ewing et al. ........... | 361/622 |
| 7,352,576 B2 * | 4/2008 | McClure ................ | 361/695 |
| 7,763,814 B2 | 7/2010 | Kozar et al. | |

* cited by examiner

*Primary Examiner* — Hung Ngo  
(74) *Attorney, Agent, or Firm* — Eckert Seamans Cherin & Mellott, LLC; Kirk D. Houser

(57) ABSTRACT

A closed door circuit breaker racking extension assembly is provided which enables a circuit breaker contained within a cell of a switchgear enclosure to be racked-in or racked-out without opening the cell door and without fear of explosive gases and debris being discharged from the cell through the extension assembly of this invention in the event of an arc-fault explosion.

7 Claims, 6 Drawing Sheets

CLOSED DOOR CIRCUIT BREAKER RACKING EXTENSION

BACKGROUND OF THE INVENTION

1. Field of the Invention

This invention relates to a closed door circuit breaker racking extension which may be used for racking-in or racking-out a circuit breaker in a switchgear cell from outside a closed cell door.

2. Description of the Related Art

Switchgear equipment such as circuit breakers, etc. are positioned within cells formed in an enclosure or cabinet with the cells being closed by a cell door. To install a circuit breaker in a cell, the cell door is opened and the circuit breaker is positioned on and secured to a circuit breaker racking device. Most racking devices include a drive shaft or threaded actuator shaft which is rotated to move the racking device and circuit board thereon inwardly into the cell for connecting the circuit board to its associated electrical equipment. It is extremely dangerous to rack-in the circuit breaker into its operative position while the cell door is open due to the danger of an arc-fault explosion occurring when the circuit breaker is being electrically connected to its associated electrical equipment. In some cases, an actuator shaft is inserted through an opening in the cell door for connection to the drive shaft of the racking device. If an arc-fault explosion occurs, dangerous gases and debris may be blown outwardly through the opening in the cell door to cause injury to the person installing the circuit breaker. In some cases, the drive shaft of the racking device is operated by a remote control. The danger of gases and debris passing outwardly through the opening in the cell door upon an arc-fault explosion still exists.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A closed door circuit breaker racking extension is provided for a switchgear including a cell in which a circuit breaker is received with a cell door enclosing the circuit breaker within the cell. A conventional circuit breaker racking assembly is provided in the cell for racking-in the circuit breaker or racking-out the circuit breaker in the cell. The circuit breaker racking assembly includes a drive shaft having an outer end which is spaced inwardly of the cell door. The cell door has an opening formed therein which is aligned with the outer end of the drive shaft.

A circuit breaker racking extension assembly is provided which has inner and outer ends and which is secured to the cell door and is positioned at the inner side thereof inwardly of an opening formed in the cell door. The circuit breaker racking extension assembly includes a vertically disposed mounting plate, having inner and outer sides, which is secured to the cell door and which has a central opening formed therein which communicates with the opening in the cell door. A box-like housing is secured to the mounting plate at the inner side thereof and includes a top wall, first and second side walls, and a bottom wall with the walls defining an interior compartment having an open outer end which communicates with the central opening in the mounting plate. The back wall of the housing has an opening formed therein which is aligned with the outer end of the drive shaft of the racking assembly. An elongated, horizontally disposed and rotatable extension shaft or rod, having inner and outer ends, is provided with the outer end of the extension shaft being positioned in the opening of the cell door and with the inner end of the extension shaft extending through the opening in the back wall of the housing.

The extension shaft is selectively movable between an outer position and an inner position with the extension shaft being yieldably urged to its outer position by a spring means. The inner end of the extension shaft is in mating engagement with the outer end of the drive shaft when the extension shaft is in its inner position whereby rotation of the extension shaft will cause the drive shaft to be rotated to cause the circuit breaker to be racked-in or racked-out depending upon the direction of rotation of the extension shaft. A seal means is provided which seals the gap between the extension shaft and the opening in the back wall of the housing.

It is therefore a principal object of the invention to provide a closed door circuit breaker racking extension.

A further object of the invention is to provide a closed door circuit breaker racking extension which may be operated from outside the cell door of a cell having the circuit breaker therein.

A further object of the invention is to provide a closed door circuit breaker racking extension which prevents dangerous gases and debris from being discharged from the cell upon an arc-fault explosion occurring.

A further object of the invention is to provide a closed door circuit breaker racking extension which is convenient and safe to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
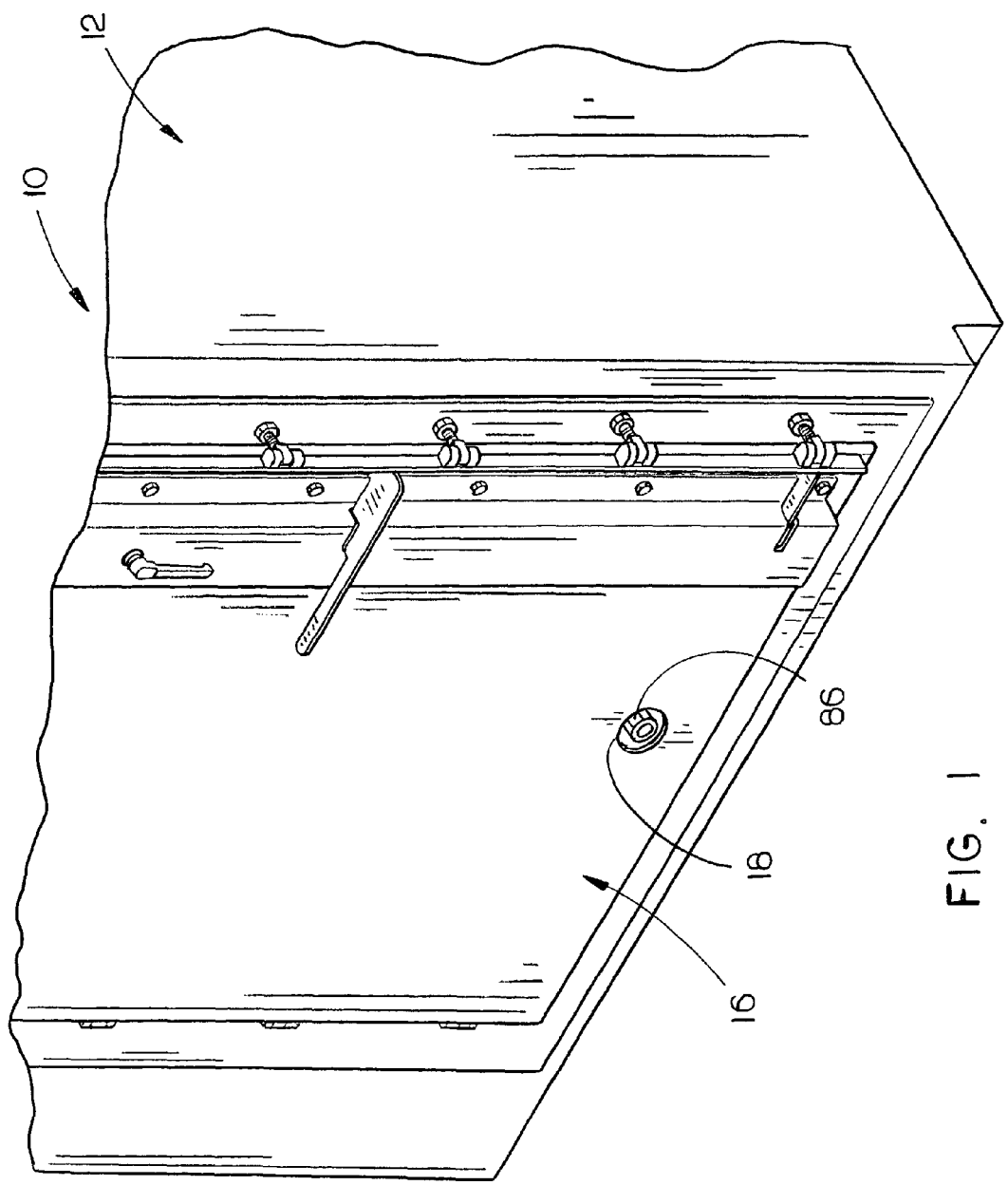
FIG. 1 is a partial perspective view of a switchgear enclosure having an opening formed therein through which the outer end of the extension shaft is exposed.
Figure 2:
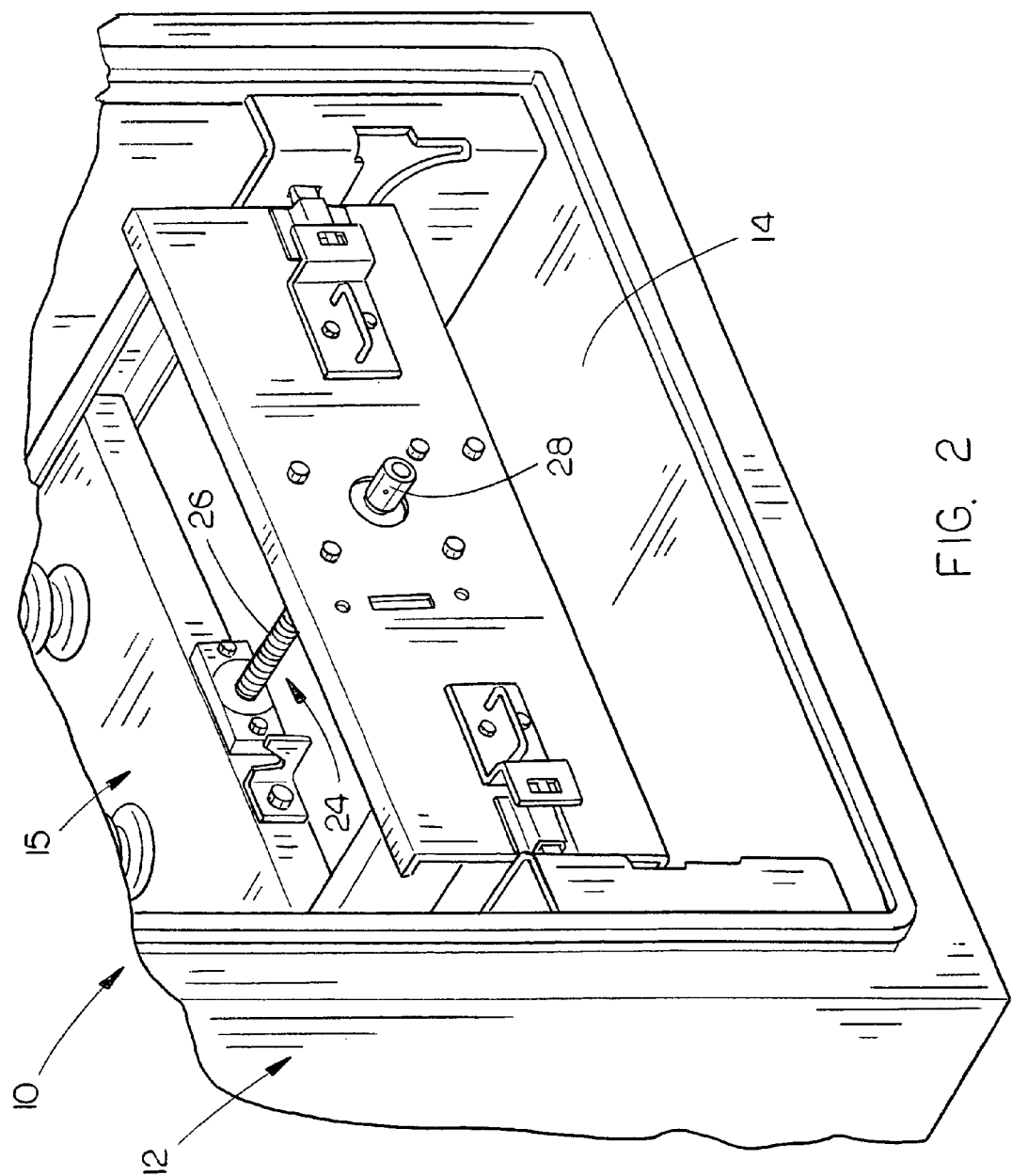
FIG. 2 is a partial perspective view illustrating a conventional racking device for use in racking a circuit breaker in a cell of a switchgear.
Figure 3:
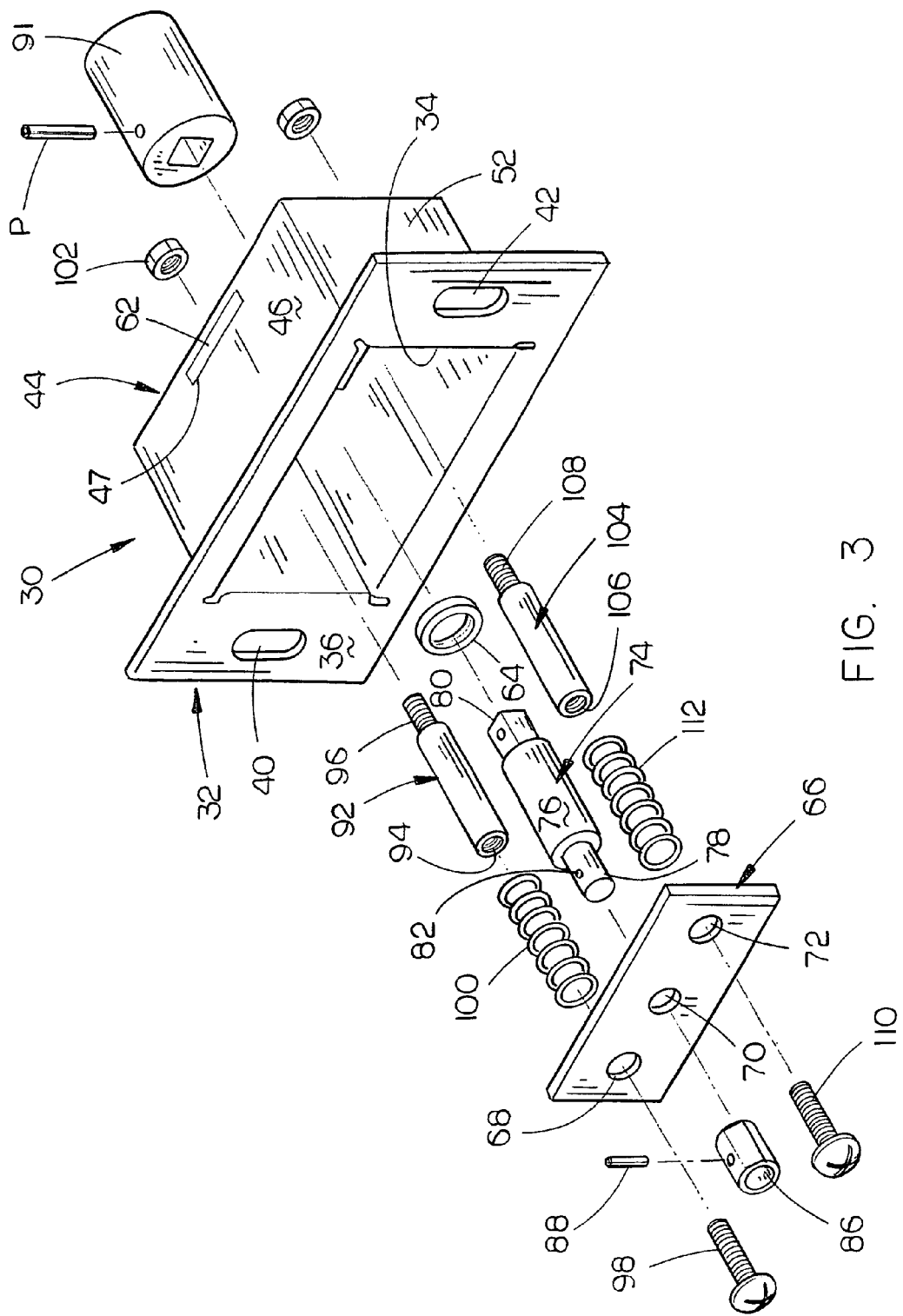
FIG. 3 is an exploded perspective view of the closed door circuit breaker racking extension assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a switchgear including an enclosure or cabinet 12 which defines a cell 14 into which a circuit breaker 15 is received in conventional fashion. The cell 14 is enclosed by a cell door 16. for purposes of description, cell door 16 will be described as having an inner side 16' and an outer side 16". Cell door 16 has a circular opening 18 formed therein and has a pair of threaded studs 10 and 22 secured thereto which extend inwardly from inner side 16' thereof.

A conventional circuit breaker racking assembly 24 is provided within cell 14 for racking-in the circuit breaker 15 or racking-out the circuit breaker 15 in cell 14. Racking assembly 24 includes a drive shaft 26 having a nut 28 secured to its outer end.

The numeral 30 refers to the closed door circuit breaker racking extension assembly of this invention which is mounted on the door 16 at the inner side 16' thereof. Assembly 30 includes a metal plate 32 having a rectangular opening 34 formed therein. For purposes of description, plate 32 will be described as having an outer side 36 and an inner side 38. Plate 32 has a pair of openings 40 and 42 formed therein adapted to receive the studs 20 and 22 respectively. Metal box or housing 44 extends from the inner side 38 of plate 32 and includes a top wall 46, bottom wall 48, side walls 50 and 52, and back wall 54. Back wall 54 of box 44 has a circular opening 56 formed therein. Back wall 54 also has a pair of bolt openings 58 and 60 formed therein. The top wall 46 has a notch 47 formed therein adjacent back wall. A plate 62 has its upper end received by the notch 47 so that plate 62 is positioned in box 44 at the front side of back wall 54. Plate 62 has a circular opening 63 formed therein which registers with opening 56 but which has a slightly larger diameter than opening 56 so that annular seal 64 may be received by the opening 63. Plate 62 is welded in place.

The numeral 66 refers to a metal plate having a height and length such that it may be received by the opening 34 in plate 32 and the open front or outer end of box 44. Plate 66 has openings 68, 70 and 72 formed therein. The numeral 74 refers to an extension shaft or rod having a cylindrical body portion 76, a reduced diameter cylindrical end portion 78 and an end portion 80 which has a square cross-section. End portion 78 of shaft 74 has a pin bore 82 formed therein. End portion 80 of shaft 74 has a pin bore 84 formed therein. End portion 78 extends through opening 70 of plate 66 and has a nut 86 secured thereto by pin 88 which extends through pin bore 90 of socket 88 and pin bore 82 of end portion 78 of shaft 74. The end of cylindrical body portion 76 extends through the annular seal 64 in sealing engagement therewith and through opening 56. End portion 80 of shaft 80 has a socket 91 secured thereto by a pin P. Socket 91 is designed to receive nut 28 therein as will be described hereinafter.

Figure 4:
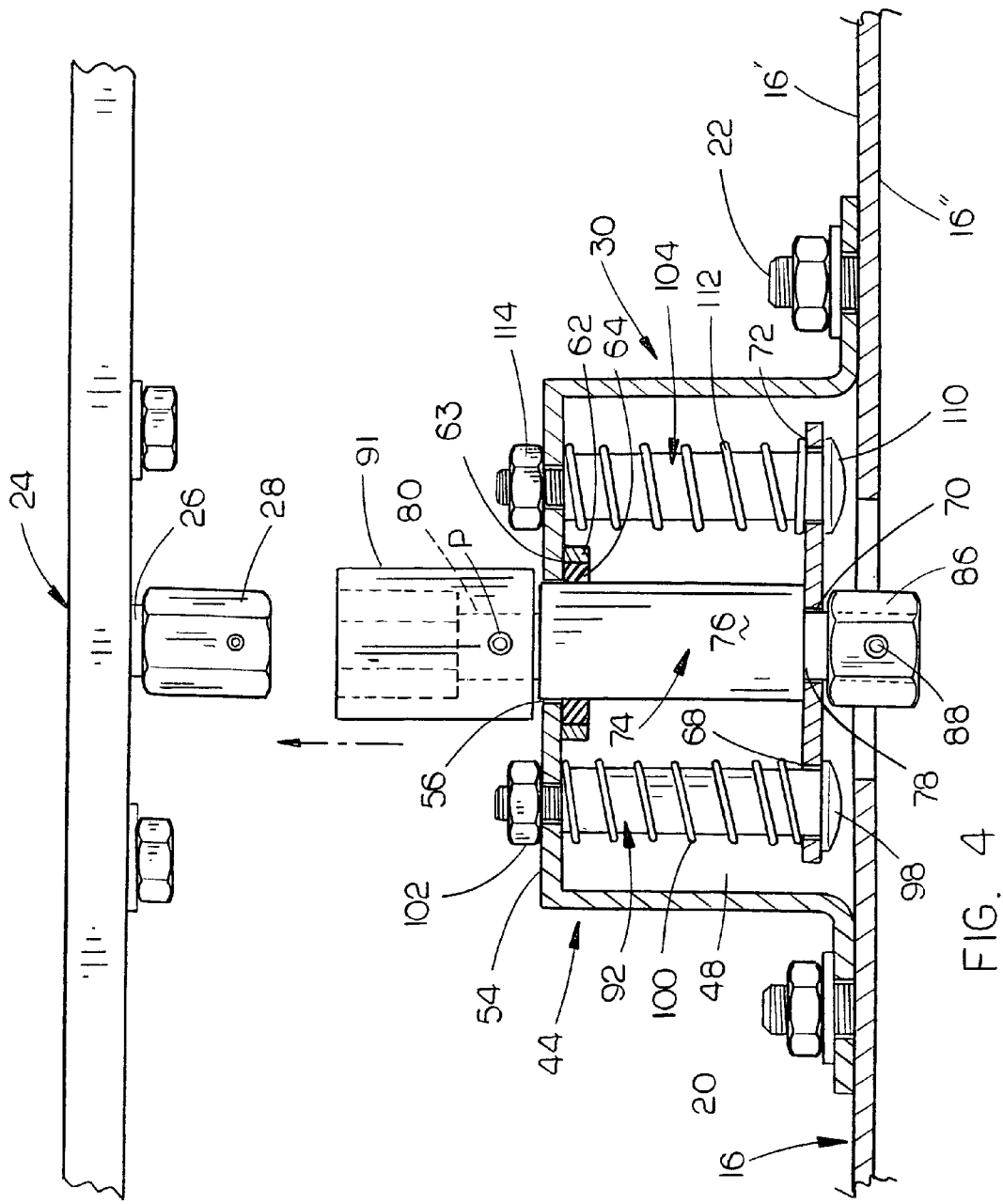
FIG. 4 is a partial sectional view of the assembly of FIG. 3 and the outer end of a racking device.
Figure 5:
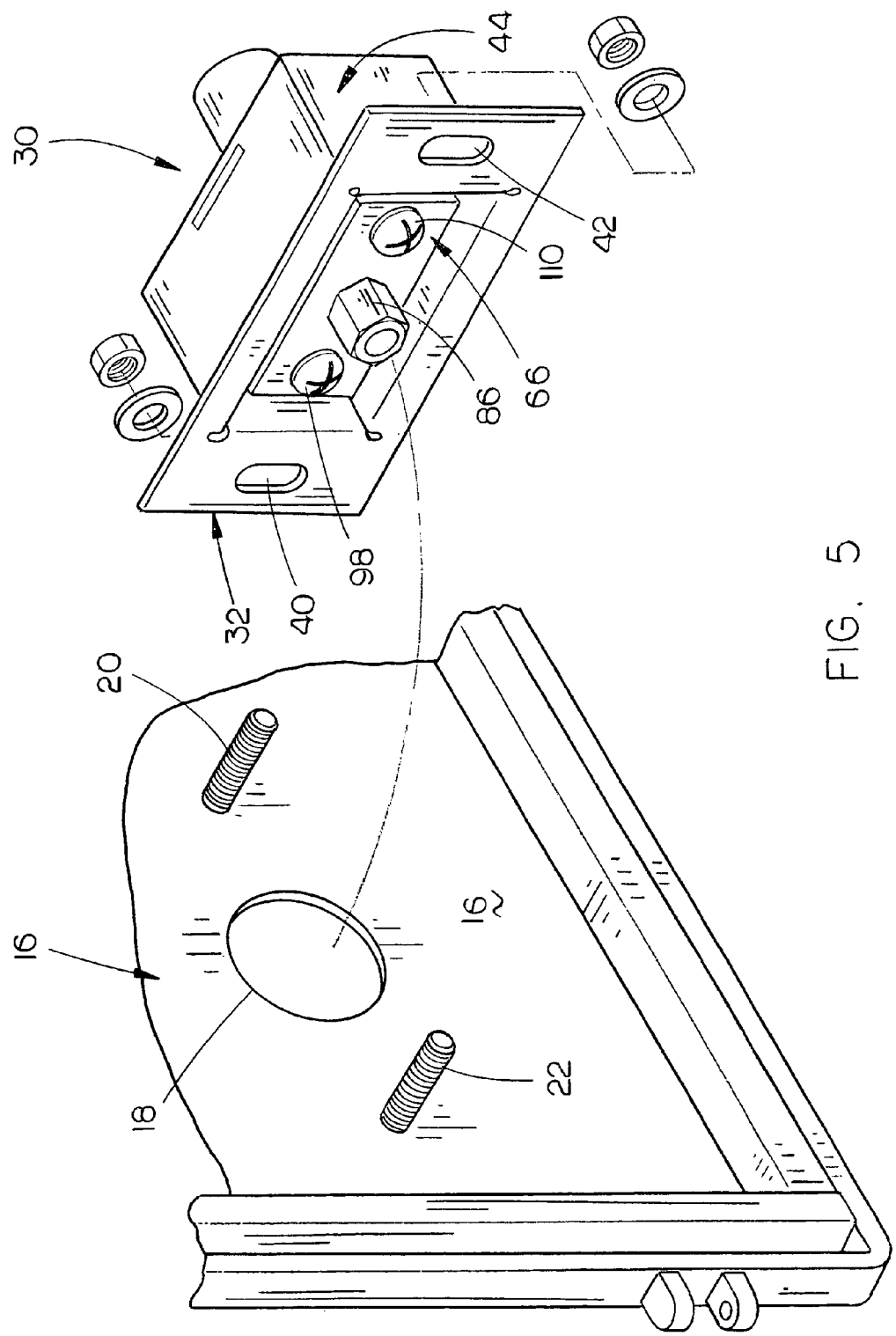
FIG. 5 is a partial exploded perspective view illustrating the manner in which the closed door circuit breaker racking extension assembly of this invention is secured to the inside surface of the cell door.
Figure 6:
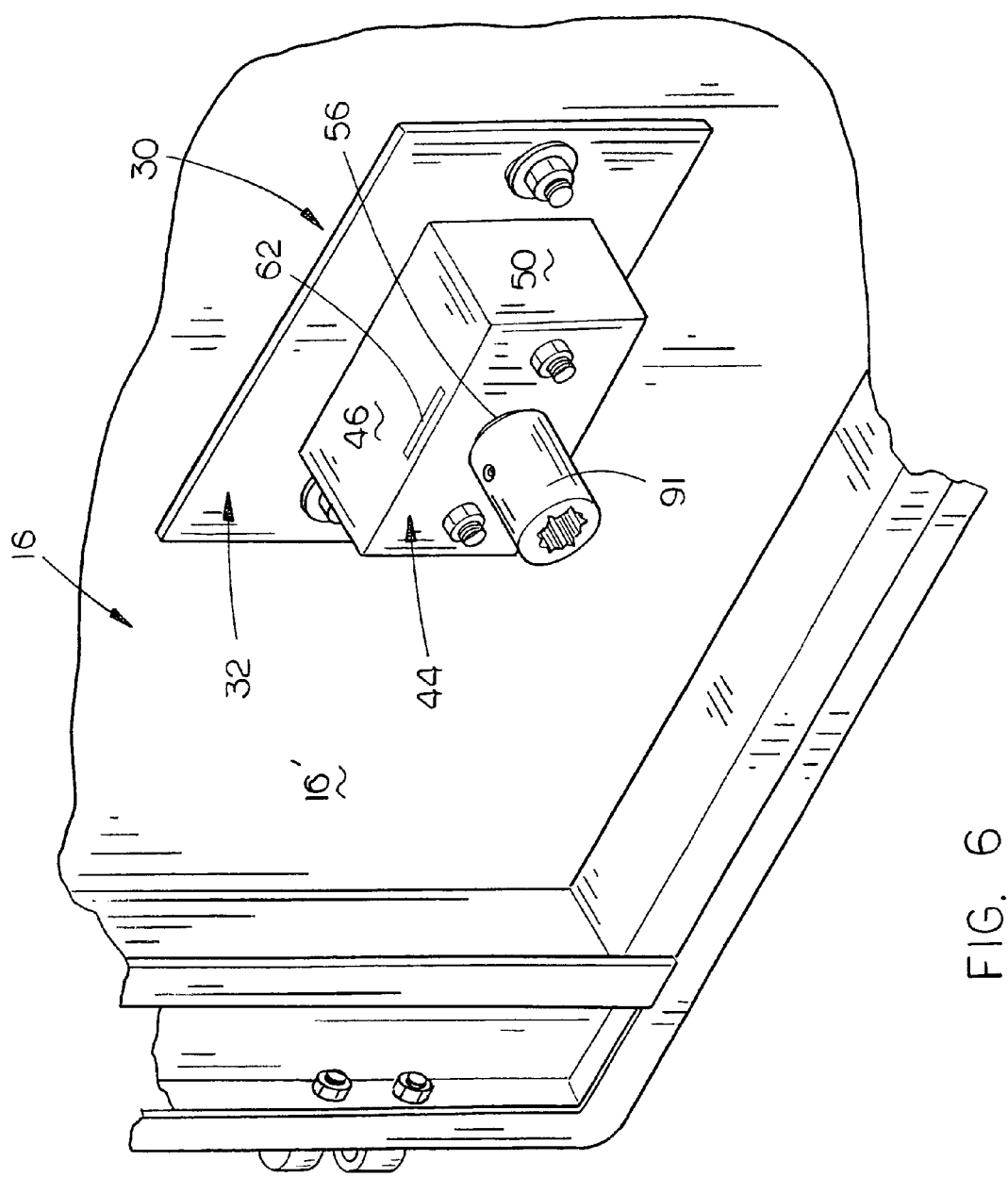
FIG. 6 is a rear perspective view of the closed door circuit breaker racking extension assembly of this invention secured to the inside surface of the cell door.

The numeral 92 refers to a rod having an internally threaded opening 94 at one end thereof and a threaded stud 96 extending from the other end thereof. Screw or bolt 98 extends through opening 68 in plate 66 and is threadably received by the opening 94 of rod 92. Spring 100 embraces rod 92 as seen in FIG. 4. The stud 96 of rod 92 extends through opening 58 in back wall 54 of box 44 and is held therein by nut 102. The numeral 104 refers to a rod having an internally threaded opening 106 at one end thereof and a threaded stud 108 extending form the other end thereof. Screw or bolt 110 extends through opening 72 in plate 66 and is threadably received by the opening 106 of rod 104. Spring 112 embraces rod 104 as seen in FIG. 4. The stud 108 of rod 104 extends through opening 60 in back wall 54 of box 44 and is held therein by nut 114.

Assuming that it is desired to position a circuit breaker into the enclosure, the cell door 16 is opened and a circuit breaker is placed on the circuit breaker racking assembly 24. The cell door 16 is then closed.

The closed door circuit breaker racking extension assembly 30 of this invention is secured to the inside surface of the door 26 as previously described so that the nut 86 is positioned in the opening 18 in the door 16. At that time, the springs 100 and 112 will yieldably urge the assembly to its outer position wherein the socket 91 is spaced from the nut 28 as seen in FIG. 4. At that time, the seal 64 sealably engages the outer surface of the cylindrical portion 76 of the shaft 74 so that any explosive gases or debris created within the cell by an arc-fault explosion are prevented from passing through the housing 44 and outwardly through the opening 18 in cell door 16. Further, the plate 66 acts as a baffle plate to additionally prevent explosive gases and debris from passing therethrough.

When it is desired to rack-in the circuit breaker within the cell 14, an electric or powered drill or the like is attached to the nut 86. Inward pressure is applied to the nut 86 which causes the extension shaft 74 to move inwardly in the direction of the arrow as illustrated in FIG. 4 so that the socket 91 receives the nut 28 on the drive shaft 26. The tool is then operated so that the shaft 74 is rotated which causes the drive shaft 26 to rack-in the circuit breaker into its electrical connection with its associated equipment. Should an arc-fault explosion occur as the circuit breaker is racked-in, the seal 64 prevents gases and debris from passing through the housing 44 due to its sealing engagement with the shaft 74. When the circuit breaker has been racked-in, inward pressure is relieved on the nut 86 with the springs 100 and 112 causing the shaft 74 to return to the position illustrated in FIG. 4.

Thus it can be seen that a novel closed door circuit breaker racking extension has been provided which enables a circuit breaker to be racked-in or racked-out while the cell door 16 is in its closed position and wherein the extension assembly prevents explosive gases and debris from passing therethrough should an arc-fault explosion occur.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
    a switchgear including a cell into which a circuit breaker is received with a cell door, having inner and outer sides, which encloses the circuit breaker within said cell;
    a circuit breaker racking assembly in said cell for racking-in the circuit breaker or racking-out the circuit breaker in said cell;
    said circuit breaker racking assembly including a drive shaft having an outer end which is spaced inwardly of said cell door;
    said cell door having an opening formed therein which is aligned with said outer end of said drive shaft;

and a closed door circuit breaker racking extension assembly, having inner and outer ends, secured to said cell door and positioned at said inner side thereof inwardly of said opening in said cell door;

said closed door circuit breaker racking extension assembly including a vertically disposed mounting plate, having inner and outer sides, which is secured to said cell door and which has a central opening formed therein which communicates with said opening in said cell door, a box-like housing secured to said mounting plate and having a top wall, first and second side walls and a bottom wall with the said walls defining an interior compartment having an open outer end which communicates with said central opening in said mounting plate, said back wall having an opening formed therein which is aligned with said outer end of said drive shaft, an elongated, horizontally disposed and rotatable extension shaft having inner and outer ends, said outer end of said extension shaft being positioned in said opening in said cell door, said inner end of said extension shaft extending through said opening in said back wall;

said extension shaft being selectively movable between an outer position and an inner position;

said extension shaft being yieldably urged to said outer position;

said inner end of said extension shaft being in engagement with said outer end of said drive shaft when said extension shaft is in said inner position whereby rotation of said extension shaft will cause said drive shaft to be rotated to cause said circuit breaker to be racked-in or racked-out depending upon the direction of rotation of said extension shaft.

2. The combination of claim 1 further including a seal means which seals the gap between said extension shaft and said opening in said back wall of said housing.

3. The combination of claim 1 wherein a pair of horizontally spaced-apart spring members yieldably urge said extension shaft to said inner position.

4. The combination of claim 1 wherein a socket is secured to said inner end of said extension shaft which engages said outer end of said drive shaft when said extension shaft is in said inner position.

5. The combination of claim 1 wherein said mounting plate and said housing close, except for said opening in said back wall of said housing, said opening in said cell door.

6. The combination of claim 2 wherein said mounting plate and said housing close, except for said opening in said back wall of said housing, said opening in said cell door.

7. The combination of claim 1 wherein a second vertically disposed plate is positioned in said interior compartment adjacent said mounting plate and wherein first and second horizontally spaced-apart rods extend horizontally outwardly from said back wall of said housing towards said mounting plate, said second plate being movably mounted on said first and second rods whereby said second plate will be moved inwardly into said compartment as said extension shaft is moved from said outer position to said inner position and wherein a spring embraces each of said first and second rods to yieldably urge said second plate outwardly which causes said extension shaft to be yieldably urged to its outer position.

* * * * *